Aug. 17, 1937. R. E. BOWLEY Re. 20,467

SOUND REPRODUCING APPARATUS

Original Filed Sept. 12, 1932 2 Sheets-Sheet 1

INVENTOR

Raymond E. Bowley

SOUND REPRODUCING APPARATUS

Original Filed Sept. 12, 1932 2 Sheets-Sheet 2

INVENTOR

Raymond E Bowley

Reissued Aug. 17, 1937

Re. 20,467

UNITED STATES PATENT OFFICE 20,467

SOUND REPRODUCING APPARATUS

Raymond E. Bowley, San Anselmo, Calif.

Original No. 1,934,693, dated November 14, 1933, Serial No. 632,763, September 12, 1932. Application for reissue October 12, 1935, Serial No. 44,754

17 Claims. (Cl. 181—31)

This invention relates to improved methods and apparatus for tone compensation in sound reproducing apparatus of the class adapted for use with radio receiving sets in the home, theatre sound systems and other apparatus used in transmitting sound vibrations, that use a cabinet type sound baffle and baffle board having an orifice therein.

One object of the invention is the provision in a cabinet or casing having sound producing means therein of auxiliary tone compensating means of a tubular nature adapted to blend and bring together reproduced tones having different but definitely related frequencies, as fundamental tones and the harmonics and overtones accompanying said fundamental sound vibrations.

Another object of the invention is the provision of an auxiliary tone compensator device or tubular resonant diaphragm-like device adapted to serve as auxiliary sound baffle means in combination with a baffle or sound board, and forming a plurality of fluid channels adjacent an orifice in the sound baffle adapted to blend and bring together reproduced tones.

An object of the invention in general is to provide improved acoustic tone blending apparatus in combination with a cabinet and loud speaker, the action of which in response to vibrations set up therein by acoustical conduction resonance action by a loud speaker and baffle means and by sound waves within the cabinet set up by the speaker diaphragm, will reinforce certain tones and cause reproduced tones to become clear, enriched and of high fidelity, the construction of the apparatus being such that sound vibrations are conveyed and transmitted between separated fluid areas in acoustic relation with both surfaces of the diaphragm of a loud speaker, in oscillation with said diaphragm.

Another object of the invention is to provide a cabinet adapted to act as a casing for a loud speaker and having a plurality of tubular members of different dimensions disposed therein adjacent the loud speaker and arranged in fluid connection with separated fluid areas having acoustic relation with the loud speaker, the tubes of different dimensions being effective upon sound vibrations of different frequencies for improved resultant tones.

In acoustics, the quality of tone is due to the blending of several simple tones; the lowest of these tones is called the fundamental tone, and the others are called overtones.

The loudness of sound of all wind instruments is due to the resonance of the air contained within them; a very slight movement of the mouth or orifice of the instrument scarcely audible in itself is sufficient to throw the large body of air enclosed in the air column of the air chamber of the instrument into vibration, and the sound thus becomes audible at long distances. When the fundamental tone of an open pipe or tube is produced, its air column divides into two equal vibratory sections, with antinodes at the ends and a node in the middle.

Resonators do not add to or create any energy, but they may act in such a way as to allow the exiter of vibrations to generate a greater amount of energy by giving it an impedance to work against. Air columns as well as sounding boards resonate sound vibrations.

When the tubular air columns of this invention are positioned between spaced fluid areas adjacent the loud speaker, an impedance to the change in direction of movement of the air in the tubular air columns is formed by the resonant action of said air columns. The impedance formed by the air columns to the movement of vibrations therein causes vibration of the air columns in oscillation with condensations and rarefactions of air at opposite ends of the tubes in vibratory resonance with vibrations of the loud speaker diaphragm, said resonant action reinforcing vibrations having frequencies in resonance with the tubes and air columns therein, and thereby enriching the tone quality of resultant tones resonated to the ears of a listener, the oscillating vibrations also by acoustical resonance conduction through and by means of the tubes acting to blend and bring together separated sound vibrations having different, but definitely related frequencies, as, fundamental tones and the harmonics and overtones accompanying said fundamental tones.

One feature of my invention, the auxiliary diaphragm, is composed of from one to one thousand or more air columns of relatively small size, forming resonators or resonant diaphragms, with a loud speaker as exiter, and a sound baffle acting as a sounding board. The tubes act as described above, the supports shown as ring-shaped members acting to modify the resonant action of the tubes, as well as to support them in position. The slightest change in size, shape, arrangement or composition of material varies the tone effects secured, therefore it is understood I am not to be confined to the particular modification described for the purpose of illustrating the principles of the inventive concept.

It has been found that a plurality of tubes or resonant air columns produce resultant tones having greater improvement in quality than can be obtained by the use of a single tube or air column, particularly when the tubes are of different dimensions and thereby adapted to influence sound vibrations having different frequencies.

Tubes of different length are illustrated in the auxiliary diaphragm device, and tubes of different sizes are illustrated in the air chamber to the rear of the loud speaker to illustrate the acoustic principle relative to the pitch of vibratory air columns. In acoustics, the pitch of vibratory air columns varies with the length of the tube or pipe, and in inversely proportional to the length of the tube or pipe. I have found this principle also applies to the size of the tube, pipe or resonant air column means in my invention.

For convenience in illustrating the principles embodying the invention, I have shown a cone type or hollow-diaphragm only of a loud speaker, it being understood the term diaphragm also applies to a loud speaker, and that other forms of loud speaker and diaphragm may be used with the tubular tone compensating apparatus of my invention without departing from the inventive concept disclosed.

Other objects more or less apparent and too numerous to relate in detail, will appear from the description of my invention which is to follow.

For the sake of explaining my invention, I will now describe illustrative embodiments thereof.

The drawings are for the purpose of illustrating the principles of my invention and are not drawn to scale. The details of mechanical construction are left to the skill of the experienced workman employing the methods and apparatus herein described and claimed. It is understood other modifications and arrangements may be used within the inventive concept without departing from the scope of the invention.

Figure 1:
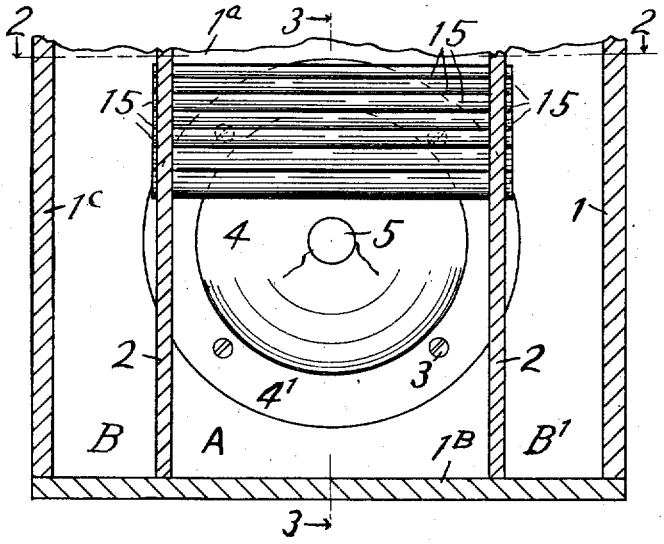
Fig. 1 is a rear elevation of acoustic apparatus constructed in accordance with my invention.
Figure 2:
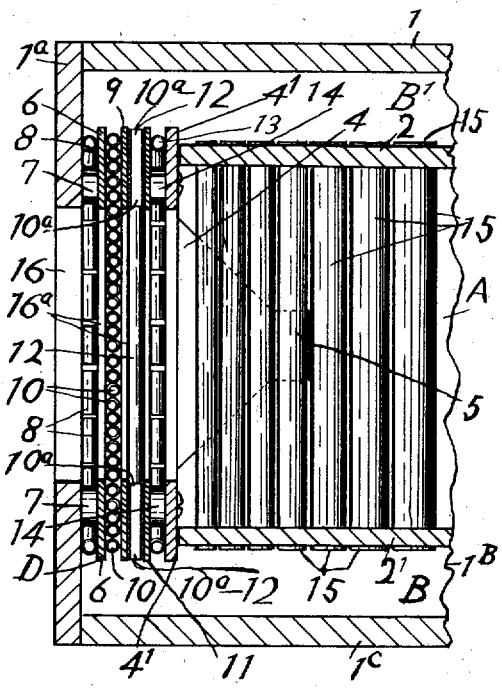
Fig. 2 is a section taken on the line 2—2 of Figure 1, with a portion of the front wall cut out to show the outlet for sound, the auxiliary diaphragm also shown cut in two to show the passage through the center thereof.
Figure 3:
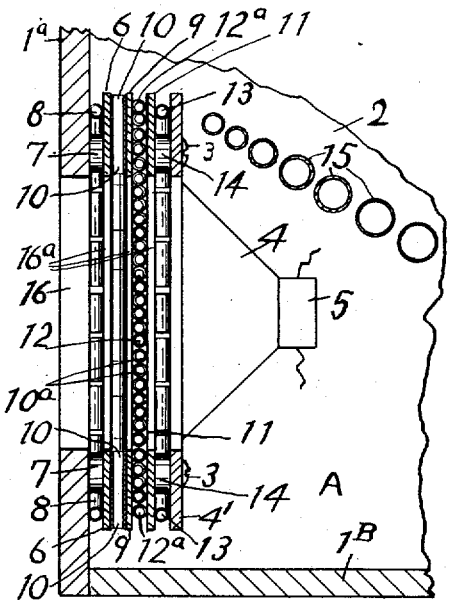
Fig. 3 is a vertical sectional view taken on the line 3—3 of Fig. 1.

Referring to the drawings, an apparatus cabinet is shown for illustration in Figures 1, 2 and 3, the cabinet having a front wall or baffle or sound board 1*a*, side walls 1 and 1*c*, a base 1B and a top, not shown; a back may be used for the air chamber A if desired; the interior of the cabinet shown has partition members 2 forming the interior of the cabinet into an air chamber A, and two spaced compartments B and B$^1$, having air columns in direct communication with the atmosphere to the rear of the cabinet, and connected through tubular passages 10A and 12 to the passage 16A in device D, and interconnecting air columns B and B$^1$ across the front of the diaphragm of the loud speaker 4; at the rear of the loud speaker 4, across air chamber A, are positioned a plurality of tubular air column passages 15, arranged in the path of sound vibrations, whereby sound vibrations may be impressed upon the tubes within the air column of air chamber A to produce in the air columns within the tubes and in the materials composing the tubes, sympathetic vibrations in vibratory oscillation with rarefactions and condensations of air set into vibration within the walls of the cabinet by the diaphragm of loud speaker 4, with the result that sound vibrations will be influenced for improved resultant tones. The tubes 10 and 10A of device D also form tubular air columns spaced from baffle 1*a* and the loud speaker 4 but interposed between said baffle and loud speaker providing tubular passages connecting the passage 16A in the opening in supports 6—9 and 11, and the interior of air chamber A, acoustically coupling said spaced fluid areas with tubular air columns, whereby oscillating sound vibrations may be set up in said tubes and tubular air columns and associated air spaces, with the result that vibrations in vibratory resonance with the tube and air columns within the tubes will be reinforced and blended with fundamental tones in vibratory resonance therewith, thereby producing resultant tones resonated to the ears of a listener that produce therein improved tone sensations.

The supports shown as ring-shaped members act to modify the resonant action of the tubes as well as to support them in position. The slightest variation in form, size, arrangement or composition of material causing variations in the quality, pitch and clarity of resultant tones. Therefore it is understood supports in other forms, size, arrangements and composition of material may be used without departing from the spirit of the invention. The loud speaker 4 and the auxiliary resonant diaphragm D are shown supported in position on baffle 1*a* by screws or bolts 3; the particular method of supporting the device D and the loud speaker is not considered in this application.

The device D forms an auxiliary baffle device spacing the loud speaker 4 from baffle 1*a* and acting as a tone compensator medium acoustically coupling said spaced co-operative elements of apparatus by means of acoustical resonance conduction action, whereby sympathetic sound vibrations will oscillate and be conveyed and transmitted between said spaced apparatus through and by means of the elements of device D. The tubes 15 also acoustically couple partition members 2 across the air column A by means of acoustical resonance conduction; said conduction action influencing sound vibrations in air columns in compartments A—B and B$^1$, forming supplementary tone chambers for blending and resonating sound vibrations.

Driving means 5 for the loud speaker may be electrodynamic, electromagnetic, or other suitable means for energizing the speaker diaphragm. The device D acts to space the speaker 4 from the baffle 1*a*, but in the arrangement shown, the rear face of the speaker flange 4$^1$ is acoustically coupled to the partition members 2 whereby sympathetic sound vibrations are imparted to said co-operative members of the associated apparatus. The pads 7 and 14 act to space the said apparatus in proper relative position whereby the tubular members are protected and the elements of auxiliary diaphragm D may vibrate in resonance with condensations and rarefactions of air set up in the adjacent fluid areas by vibrations of the speaker diaphragm in response to vibrations imparted thereto by driving means 5.

An outlet 16 is shown in the front wall or baffle 1*a* of the cabinet, for the passage of sound from the loud speaker diaphragm, one surface of the diaphragm being exposed to the atmosphere through said outlet 16, the other surface of the diaphragm being in vibratory communication with the air column of air chamber A.

Figure 4:
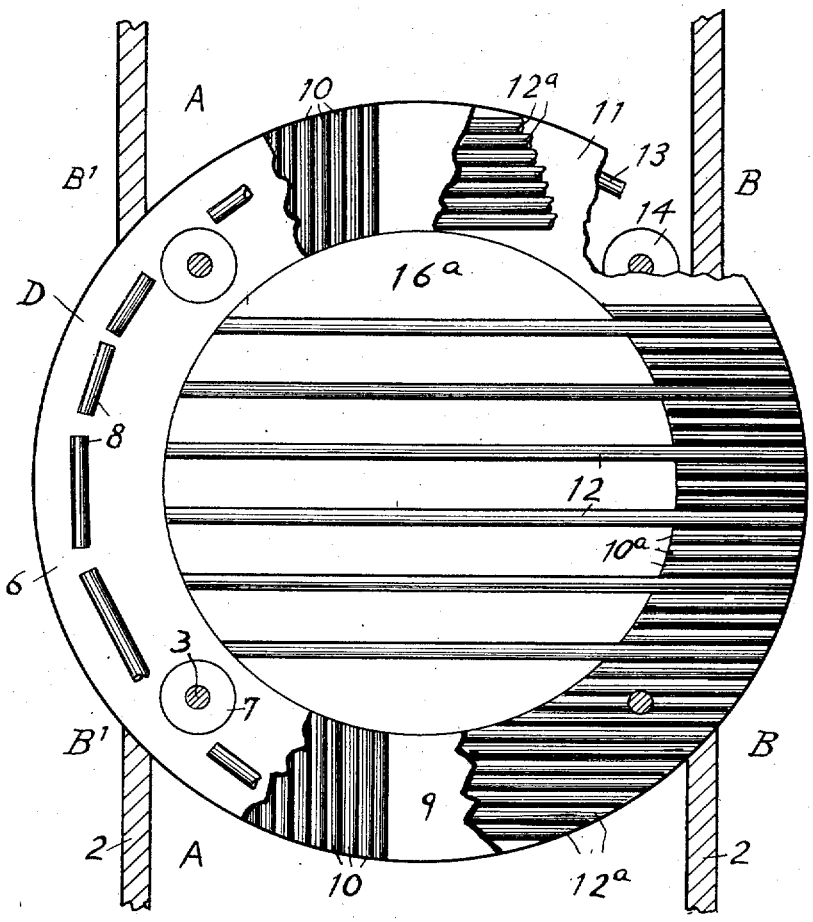
Fig. 4 is an enlarged front view of a portion of a modification of the apparatus, showing the relative positions of the supports, pads and tubular elements of the auxiliary diaphragm device.

As shown in Fig. 4 the device D includes a front ring-shaped support 6, constructed from paper, fibre or other suitable material.

Pads 7 are mounted on support 6 over supporting screws or bolts 3 and help to maintain the device D in proper position between associated co-operative apparatus, as, a sound baffle and a loud speaker, and also serve to prevent disfiguration of a plurality of short tubes 8 which are secured to and are distributed around the front surface of the ring-shaped support 6 in spaced relation to one another. Positioned between the ring-shaped support 6 and another similarly shaped and constructed support 9, are a plurality of vertically disposed tubular members 10, constructed from paper, fibre, or other suitable material. Positioned between the ring-shaped support 9 and a rearwardly disposed support 11, having the same shape and construction, are a plurality of horizontally disposed tubular members 12, some of which extend entirely across the central openings 16A in the ring-shaped supports. Suitably secured to the rear surface of the support 11 are a plurality of short tubes 13 which are distributed around said support in spaced relation to one another. A plurality of pads 14 similar to pads 7 are mounted on the surface of support 11 and serve the same purpose as described for pads 7, on the reverse side of device D.

The tubular members 10—10A, 12—12A—3 and 13 are suitably affixed to the ring-shaped supports by glue or other suitable means.

Tubes 12A are mounted between supports 9 and 11 parallel with tubes 10A and 12, but do not connect with passage 16A. The tubes 12A oscillate vibrations between opposite ends of the tubes adjacent the sound baffle, and adjacent the front of the loud speaker in air chamber A. Similar tubes are positioned parallel with tubes 10 between supports 6 and 3 at both sides of the opening 16A in device D. The spaced short tubes 13 being circumferentially distributed around the ring-shaped supports 11, serve to provide vibratory air chambers which communicate with different areas located around and between the supports.

The vertically disposed tubes 10 have one end of their air columns in communication with the air chamber A adjacent the loud speaker, the other end of their air columns in communication with passage means 16A and 16 associated with the wall structure, and leading to the atmosphere.

The sound vibrations generated in the diaphragm of the loud speaker 4 by driving means 5 which in apparatus of the class described is the means employed for translating electric impulses at audio frequencies into sound vibrations in the diaphragm of the loud speaker, which proceed through the diaphragm to associated resonant elements of the loud speaker 4 and cause the same to vibrate in sympathy, at the same time the diaphragm sets the surrounding air in adjacent fluid areas into vibration, including the air in the air columns of the apparatus described herein. The loud speaker transmits sympathetic sound vibrations to the elements of device D and to partition members 2 which in turn re-act upon the tubes and vibratory air columns therein.

In acoustics an open ended pipe or tube forms an air column therein, the resonant action of which tends to resist any change in direction of vibratory movement of air therein, said acoustic resonant action causes said vibrations to be reinforced. In the apparatus described, the action of the tubular air columns and associated vibratory elements set into vibratory oscillation by sympathetic sound vibrations impressed thereon by the loud speaker and sound baffle and by sound waves in the fluid areas located at opposite ends of the tubes, in vibratory resonance with condensations and rarefactions set up in adjacent fluid areas by both surfaces of the loud speaker diaphragm tends to reinforce vibrations in resonance with the tubes and air columns therein and to blend and bring together sound waves and tones having different, but definitely related, frequencies, as, fundamental tones, and the harmonics and overtones accompanying said fundamental tones, and to assist the loud speaker and sound baffle in the process of resonating resultant tones of improved quality.

The various tubes and tubular members and supports associated with the loud speaker may be constructed in any desired form or shape from any desirable kind of material, it being apparent that other forms may be employed with equal satisfaction. The particular arrangement and relative positions of the tubes may be also varied to meet certain conditions, it sometimes being desirable to employ a larger number of tubes with their relative positions being arranged in a different order than shown on the drawings.

Different resultant tones are produced by various arrangements and combinations of the apparatus described. I wish it understood that the several features of my invention may be used either singly or collectively without departing from the scope of the claims and that my invention be defined by the following appended claims and not by the particular detailed description herein made.

What I claim as new and desire to secure by Letters Patent of the United States is as follows:

1. An auxiliary diaphragm baffle device of the class described for use to influence sound vibrations for improved resultant tones in combination with a loud speaker and a sound baffle having an outlet for sound, comprising an orificed support of sheet material having a plurality of tubes arranged thereon parallel with a surface thereof and positioned adjacent to and around said orifice in the support.

2. An auxiliary resonant vibratory baffle device of the class described, formed for use in combination with a loud speaker and sound baffle means having an outlet for sound substantially as described, comprising an assembly of open ended hollow units and orificed supporting means, the hollow units arranged upon the support means so as to be positioned substantially at right angles to the axis of the speaker diaphragm and adjacent said outlet in the sound baffle in front of the loud speaker, whereby sound vibrations may be impressed upon said device and sound vibrations caused to oscillate in the air columns and elements of said device between spaced fluid areas to the rear of said baffle member and outlet, in front of and adjacent the loud speaker.

3. In acoustic apparatus for propagating and resonating sound, the combination with a cabinet and a loud speaker having a diaphragm with driving means, of an auxiliary vibratory device of the class described, said device comprising ring shaped supporting means having a series of tubular members mounted thereon, the loud speaker and said device located within the cabinet, the device positioned in front of the loud speaker adjacent a cabinet wall having an outlet for sound propagated from the loud speaker.

4. In acoustic apparatus for propagating and resonating sound, the combination with a sound baffle and a loud speaker having a diaphragm with driving means, of a resonant vibratory device of the class described, comprising supporting means of sheet material having an opening therein for the passage of sound vibrations, and means secured thereto forming a plurality of tubular air columns arranged in front of the loud speaker adjacent the sound baffle, the device and sound baffle means acting jointly with the loud speaker to influence sound vibrations for improved resultant tones.

5. In combination in an acoustic device for propagating and resonating sound vibrations, a tubular tone compensating device composed of supporting means and means forming a plurality of tubular air columns mounted thereon, the support means having an opening for the passage of sound, the tubular air columns arranged adjacent to and around said opening in the support, a loud speaker and sound baffle means having an outlet therein spaced from one another by said device, the device influencing sound vibrations for improved resultant tones.

6. In combination in acoustic apparatus for propagating and resonating sound, with a cabinet divided into compartments, and a loud speaker mounted in one compartment of the cabinet, having an outlet for sound, the speaker having a diaphragm with driving means and a structure supporting the diaphragm and driving means, one surface of the diaphragm in vibratory communication with the atmosphere through said outlet, the other surface of the diaphragm in communication with the air column in said compartment, of an open ended hollow unit located in said compartment in the path of sound waves, opposite ends of said unit coupled to spaced elements, with the air column therein in vibratory communication with spaced fluid areas within the walls of the cabinet.

7. In combination in acoustic apparatus for propagating and resonating sound spaced walls forming an air chamber, a plurality of tubular air column passages of different dimensions, and a loud speaker, said loud speaker and tubular passages located within the air chamber, the air chamber having an outlet for sound from the loud speaker, said tubular air column passages arranged in the air chamber with the loud speaker and located in the path of sound waves propagated by the loud speaker in the air chamber, the members forming the air column passages connected acoustically with said wall structure, thereby imparting sympathetic vibrations thereto, also conveying and transmitting sympathetic sound vibrations between spaced fluid areas by means of acoustical resonance conduction while in vibration, the said tubular passages spaced from the front wall member, the tubular means being of different dimensions to influence sound vibrations having different frequencies for improved resultant tones.

8. Acoustic apparatus for propagating and resonating sound, comprising a cabinet divided into compartments and having a baffle member with an outlet for sound from a compartment forming an air chamber in the cabinet, a loud speaker positioned in the air chamber to direct sound vibrations through said outlet, the speaker having a diaphragm and driving means for the diaphragm, one surface of the diaphragm of the speaker in communication with the atmosphere through said outlet, the other surface of the diaphragm in communication with the air column of said air chamber, a tubular medium forming a device of the class described supported between the loud speaker and the baffle member with the outlet therein, and a plurality of open ended tubes of different dimensions forming resonant hollow bodies located to the rear of the loud speaker in the air chamber and arranged in the path of sound vibrations to influence sound vibrations of different frequencies for resultant tones having improved quality.

9. Acoustic apparatus comprising the combination with sound propagating means including a diaphragm, driving means and a structure supporting the diaphragm and driving means, and a cabinet, having an outlet for sound from said diaphragm, said apparatus located within the cabinet, of means forming a tubular air column, the tubular air column positioned in the cabinet adjacent said diaphragm in the path of sound waves propagated in the cabinet by the diaphragm, and arranged between the diaphragm and the cabinet wall structure, whereby sound vibrations will be impressed upon said tubular means and resultant tones having improved quality obtained from the apparatus, the tubular air column means located to the rear of the front wall structure of the cabinet.

10. The combination in apparatus for propagating and resonating sound, with an air chamber formed by associated walls, of a plurality of tubular air columns of different dimensions located in the air chamber in spaced relation to the front wall of the air chamber, the air chamber having an outlet for sound in a baffle member associated with the wall structure, and sound propagating means including a diaphragm, driving means and a structure supporting the diaphragm and driving means, the diaphragm and associated elements located in the air chamber, the tubular air columns positioned vertically in the air chamber and spaced from the diaphragm in the path of sound waves propagated from said diaphragm in the air chamber, one end of the tubular air column means having communication with the air chamber, the other end of the air column means having communication with a fluid passage connecting with the outer atmosphere, tubes of different dimensions being effective in assembly for influencing sound vibrations having different frequencies, whereby improved resultant tones may be obtained from said apparatus.

11. Acoustic apparatus for propagating and resonating sound comprising a loud speaker and tubular tone compensating means, the loud speaker having a diaphragm with driving means and a structure supporting the diaphragm and driving means, the tubular means comprising a plurality of tubes and orificed supporting means, forming a supplementary baffle device located in front of the loud speaker, the said supporting means provided with an opening for the passage of sound from the loud speaker diaphragm, the tubes arranged substantially at right angles to the axis of the diaphragm of the loud speaker and positioned on the support adjacent to and around said opening therein, one end of the tubes facing the fluid area forming a passage through said opening, the other end of the tubes facing the fluid area around and adjacent the front outer periphery of the loud speaker, the loud speaker having a front outer periphery.

12. Acoustic apparatus of the class described comprising an apparatus cabinet, a loud speaker having a diaphragm with driving means and a structure supporting the diaphragm and driving means, a tubular member, and orificed supporting means for the tubular member; the cabinet having an air chamber and an opening in the wall structure and baffle means for the passage of sound, the loud speaker positioned in the cabinet and air chamber to direct sound vibrations through said opening, the tubular member supported in the air chamber to the rear of said outlet and to the rear of the front wall structure of the cabinet, whereby sound vibrations set in motion within the air chamber and cabinet are caused to be impressed upon said tubular member and the air within said member to be blended and resonated to the ears of a listener with resultant tones having improved clarity, the tubular member having an open ended air column in communication with spaced fluid areas to the rear of the front wall structure of the cabinet, one of said areas separated from the air column of said air chamber and connected with the atmosphere outside the cabinet.

13. A cabinet having an air chamber provided for a loud speaker, a loud speaker, a plurality of open ended hollow members forming resonant bodies, and orificed supporting means for the hollow members, the cabinet having an outlet for sound from the air chamber through a member associated with the cabinet wall structure, the hollow members positioned to vibrate in the said air chamber in the path of sound waves propagated from the loud speaker to the rear of the front wall structure and to the rear of said outlet, the loud speaker positioned in the air chamber to direct sound vibrations through said outlet and arranged in relation to said hollow members and the cabinet wall structure, whereby sound vibrations are caused to be impressed upon said hollow members and the air columns therein, whereby the elements and air columns of said open ended hollow members are caused to influence sound vibrations for resultant tones having improved quality, the hollow members supported in the air chamber to the rear of the front wall structure of the cabinet.

14. Acoustic apparatus of the class described comprising the combination with a cabinet and a loud speaker having a diaphragm with driving means, of a supplementary tone blending compartment within the cabinet forming a supplementary air column within the cabinet, partition means forming said air column, the air column arranged in the cabinet in association with the cabinet wall structure and the loud speaker as tone improving means, an opening provided in the cabinet, the loud speaker positioned in the cabinet to direct sound vibrations through said opening, the said supplementary air column having communication with the outer atmosphere and also having communication with a spaced area adjacent a surface of the speaker diaphragm, whereby sound vibrations are caused to oscillate within the said air column to be blended and resonated to the ears of a listener with improved resultant tones.

15. Acoustic apparatus of the class described, comprising a cabinet, an air chamber within the cabinet having an outlet provided for the passage of sound, partition means and a supplementary compartment forming a tone chamber and supplementary open resonant air column located within the cabinet and spaced from said air chamber by partition means arranged to form said supplementary compartment and resonant air column, the said supplementary air column having communication with the outer atmosphere and arranged in vibratory relation to the air chamber and cabinet wall structure, whereby resonance is added to resultant tones during operation of said apparatus in combination with a loud speaker, a loud speaker having a diaphragm with driving means and a structure supporting the diaphragm and driving means positioned in the cabinet adjacent said outlet to direct sound vibrations through said outlet and to impress sympathetic vibrations upon said supplementary air column, causing sound vibrations to be blended and resonated to the ears of a listener with improved resultant tones.

16. Acoustic apparatus of the class described comprising a cabinet, a loud speaker, and resonant air column tone compensating means, the cabinet having an outlet for sound, the loud speaker having a diaphragm with driving means and a structure supporting the diaphragm and driving means, the speaker positioned in the cabinet to direct sound vibrations through said outlet, the tone compensating means comprising orificed auxiliary sound baffle means having at least one supplementary resonant air column associated therewith and arranged in the cabinet adjacent to and parallel with the front wall structure of the cabinet, said tone compensating means positioned in the cabinet adjacent the loud speaker in the path of sound vibrations to the rear of the front wall structure of the cabinet, so that sound vibrations propagated from one surface of the speaker diaphragm will pass through said orifice in the tone compensating means to said outlet and through the outlet to the atmosphere, the other surface of the diaphragm in communication with the interior of the cabinet, the arrangement causing oscillating sound vibrations to be set up within said supplementary resonant air column means, whereby sound vibrations are reinforced and fundamental sound vibrations and their accompanying harmonics and overtones are blended and resonated to the ears of a listener, producing therein resultant tone sensations having improved timbre and clarity.

17. Acoustic apparatus of the class described, comprising a sound board, a loud speaker and supplementary resonant air column tone compensating means, the sound board having an opening for the passage of sound, the loud speaker having a diaphragm with driving means and a structure supporting the diaphragm and driving means, the speaker positioned to direct sound vibrations through said opening in the sound board, the resonant air column means positioned adjacent the loud speaker and sound board in the path of sound vibrations to the rear of the sound board, whereby sound vibrations are caused to be impressed upon the supplementary air column means, the arrangement influencing sound vibrations for improved resultant tones by means of acoustical resonance conduction action of said air column means.

RAYMOND E. BOWLEY.